United States Patent
Samworth (10) Patent No.: US 8,838,388 B2
(45) Date of Patent: Sep. 16, 2014

(54) METHOD OF ENHANCING ATTRIBUTES OF LOGS OF GEOLOGICAL FORMATIONS

(75) Inventor: James Roger Samworth, Ashby de la Zouch (GB)

(73) Assignee: Reeves Wireline Technologies Limited (GB)

( * ) Notice: Subject to any disclaimer, the term of this patent is extended or adjusted under 35 U.S.C. 154(b) by 887 days.

(21) Appl. No.: 12/575,178

(22) Filed: Oct. 7, 2009

(65) Prior Publication Data
US 2010/0094558 A1    Apr. 15, 2010

(30) Foreign Application Priority Data
Oct. 7, 2008    (GB) .................................. 0818305.5

(51) Int. Cl.
*G01V 1/40*     (2006.01)
*G06G 7/48*     (2006.01)
*G01V 3/28*     (2006.01)

(52) U.S. Cl.
CPC ...................................... *G01V 3/28* (2013.01)
USPC ............................................... 702/6; 703/10

(58) Field of Classification Search
USPC ......... 702/6, 1–2, 7, 9, 11–14, 16–17, 33, 38, 702/57, 64–67, 69–73, 75–77, 81, 84–85, 702/94–95, 106, 127, 150, 152–153, 166, 702/182–183, 189–191, 194–195; 324/323, 324/332–335, 337–341, 343–348, 351, 355, 324/357–358, 366, 368; 367/14, 25, 28, 30, 367/32, 33–34, 68–69, 73, 76; 703/2, 5, 10; 73/152.01–152.02, 152.46; 166/244.1, 166/250.01, 254.2
See application file for complete search history.

(56) References Cited

U.S. PATENT DOCUMENTS

| | | | |
|---|---|---|---|
| 4,297,879 A | 11/1981 | Howells et al. | |
| 4,586,137 A | 4/1986 | Frost, Jr. et al. | |
| 4,818,946 A * | 4/1989 | Barber | 324/339 |
| 4,837,517 A * | 6/1989 | Barber | 324/339 |
| 5,461,562 A * | 10/1995 | Tabanou et al. | 702/11 |
| 5,506,769 A | 4/1996 | Fu et al. | |
| 5,698,982 A * | 12/1997 | Mitchell | 324/339 |
| 6,606,565 B1 | 8/2003 | Strickland et al. | |
| 7,667,192 B2 | 2/2010 | Fricke et al. | |
| 8,035,391 B2 * | 10/2011 | Samworth | 324/339 |
| 2005/0171697 A1 | 8/2005 | Heliot et al. | |

FOREIGN PATENT DOCUMENTS

| | | |
|---|---|---|
| EP | 0539272 A2 | 4/1993 |
| GB | 2415511 A | 12/2005 |

OTHER PUBLICATIONS

Barber et al. Vertical Resolution of Well Logs: Recent Developments, Jul. 1991, Oilfield Review, pp. 24-28.*
R. Nelson and W. Mitchell, Improved Vertical Resolution of Well Logs by Resolution Matching, Jul.-Aug. 1991, The Log Analyst, pp. 339-349.*
Collins, Jake, Combined Search and Examination Report under Sections 17 & 18(3), Jul. 11, 2008, 4 pages, UK Intellectual Property Office, UK.
Waters, Michael Powell, Combined Search and Examination Report under Sections 17 and 18(3), Feb. 6, 2009, 3 pages, Intellectual Property Office, UK.

* cited by examiner

*Primary Examiner* — Toan Le
(74) *Attorney, Agent, or Firm* — Mark A. Oathout; Oathout Law Firm (57) ABSTRACT

A method is disclosed of enhancing one or more attributes of a log, of a geological formation, including data generated in plural measurement channels corresponding to plural measurement devices, the method including the steps of: selecting data corresponding to a single said channel and deconvolving it; and seeking to impose one or more attributes of the resulting deconvolved data onto convolved log data of plural said channels in order to create an enhanced log.

17 Claims, 4 Drawing Sheets

METHOD OF ENHANCING ATTRIBUTES OF LOGS OF GEOLOGICAL FORMATIONS

CROSS-REFERENCE TO RELATED APPLICATIONS

This application claims the foreign priority of GB patent application number 0818305.5 filed Oct. 7, 2008.

STATEMENTS REGARDING FEDERALLY SPONSORED RESEARCH OR DEVELOPMENT

Not Applicable.

BACKGROUND AND SUMMARY OF THE INVENTION

This invention relates to a method of enhancing attributes of logs of geological formations.

The logging of geological formations is, as is well known, economically an extremely important activity.

Virtually all commodities used by mankind are either farmed on the one hand or are mined or otherwise extracted from the ground on the other, with the extraction of materials from the ground providing by far the greater proportion of the goods used by humans.

It is extremely important for an entity wishing to extract materials from beneath the ground to have as good an understanding as possible of the conditions prevailing in a region from which extraction is to take place.

This is desirable partly so that an assessment can be made of the quantity and quality, and hence the value, of the materials in question; and also because it is important to know whether the extraction of such materials is likely to be problematic.

The acquisition of such data typically makes use of techniques of logging. Logging techniques are employed throughout the mining industry, and also in particular in the oil and gas industries. The invention is of benefit in logging activities potentially in all kinds of mining and especially in the logging of reserves of oil and gas.

In the logging of oil and gas fields specific problems can arise. Broadly stated this is because it is necessary to consider a geological formation that typically is porous and that contains a hydrocarbon-containing fluid such as oil or gas or (commonly) a mixture of fluids only one component of which is of commercial value.

This leads to various complications associated with determining physical and chemical attributes of the oil or gas field in question. In consequence a wide variety of logging methods has been developed over the years. The logging techniques exploit physical and chemical properties of a formation usually through the use of a logging tool or sonde that is lowered into a borehole (that typically is, but need not be, a wellbore) formed in the formation by drilling.

Typically the tool sends energy into the formation and detects the energy returned to it that has been altered in some way by the formation. The nature of any such alteration can be processed into electrical signals that are then used to generate logs (i.e. graphical or tabular representations containing much data about the formation in question). A log can be considered as the result of a mathematical convolution of the geological data along the formation penetrated by the wellbore with the spatial response function of the well-logging tool. The convolution referred to is the process of perturbation caused to the geological data by the inherent properties of the measuring device (logging tool) employed, the perturbed data then being the log of the data.

The borehole usually is several tens of thousands of feet in length yet is narrow (being perhaps as narrow as 3 inches (about 76 mm) or less in diameter), although in practice such a borehole is almost never of uniform diameter along its length. The small diameter and great length of a typical borehole mean that there are particular problems associated with accurately obtaining physical data through operation of the logging tool and then reliably transmitting the data to a surface location. Indeed it could be said that almost all log data are obtained by processes that involve at least some degree of compromise. The invention seeks to ameliorate the effects of compromise when using in particular but not exclusively an array induction logging tool.

It is known in the logging art to use various kinds of resistivity-measuring tool that provide signals indicative of the resistivity of a geological formation surrounding the tool as a result of the intentional conduction of an electrical current through the formation.

Resistivity tools are particularly favored since information about resistivity (or its inverse, conductivity) conveys to geologists, geophysicists and logging engineers important data about the substances in the formation.

During the creation of a wellbore drilling engineers habitually employ a drilling mud. Drilling mud performs numerous functions during the drilling of the wellbore.

As is well known in the hydrocarbon extraction arts, the composition of the mud is chosen and/or adjusted to suit characteristics of the formation geology, the dimensions of the wellbore, the drilling equipment used and numerous other variables. The drilling mud is pumped into the wellbore as the latter is formed, and for various reasons remains in the bore typically until shortly before the well is cased (i.e. a steel pipe is inserted and cemented into place).

One broadly defined category of drilling mud is known as an oil-based mud or OBM.

OBM is essentially electrically non-conducting. It follows that a resistivity tool utilizing current-emitting electrodes cannot be used in a wellbore that has been drilled using OBM since the OBM in the wellbore insulates the tool from the formation such that no direct current can flow.

On the other hand the presence of an OBM in the wellbore does not preclude the use of an induction-type of logging tool, whose operation relies on induced electric fields and therefore does not require a direct conduction path.

During induction logging an induction tool typically is lowered into and subsequently removed from a borehole on a wireline the nature and purpose of which are well known in the logging art. Like most logging tools the induction tool is an elongate cylinder having at spaced intervals along its length various components whose function is to transmit energy (that in the case of the induction tool is electrical energy) through a geological formation and receive (by induction in the case of the induction tool) energy that is indicative of characteristics of the formation. The logging tool converts such energy into signals that may be transmitted via the wireline and/or recorded for later use.

Broadly stated an induction tool includes a transmitter that transmits a high-frequency alternating current (electromagnetic wave) into the formation. This induces eddy currents in the formation surrounding the tool at the depth to which the moving tool has been lowered. The induction tool also includes at least one and, in practical versions, several receivers of induced current energy. As the eddy currents circulate they can be detected by the receivers.

Figures 1, 2:
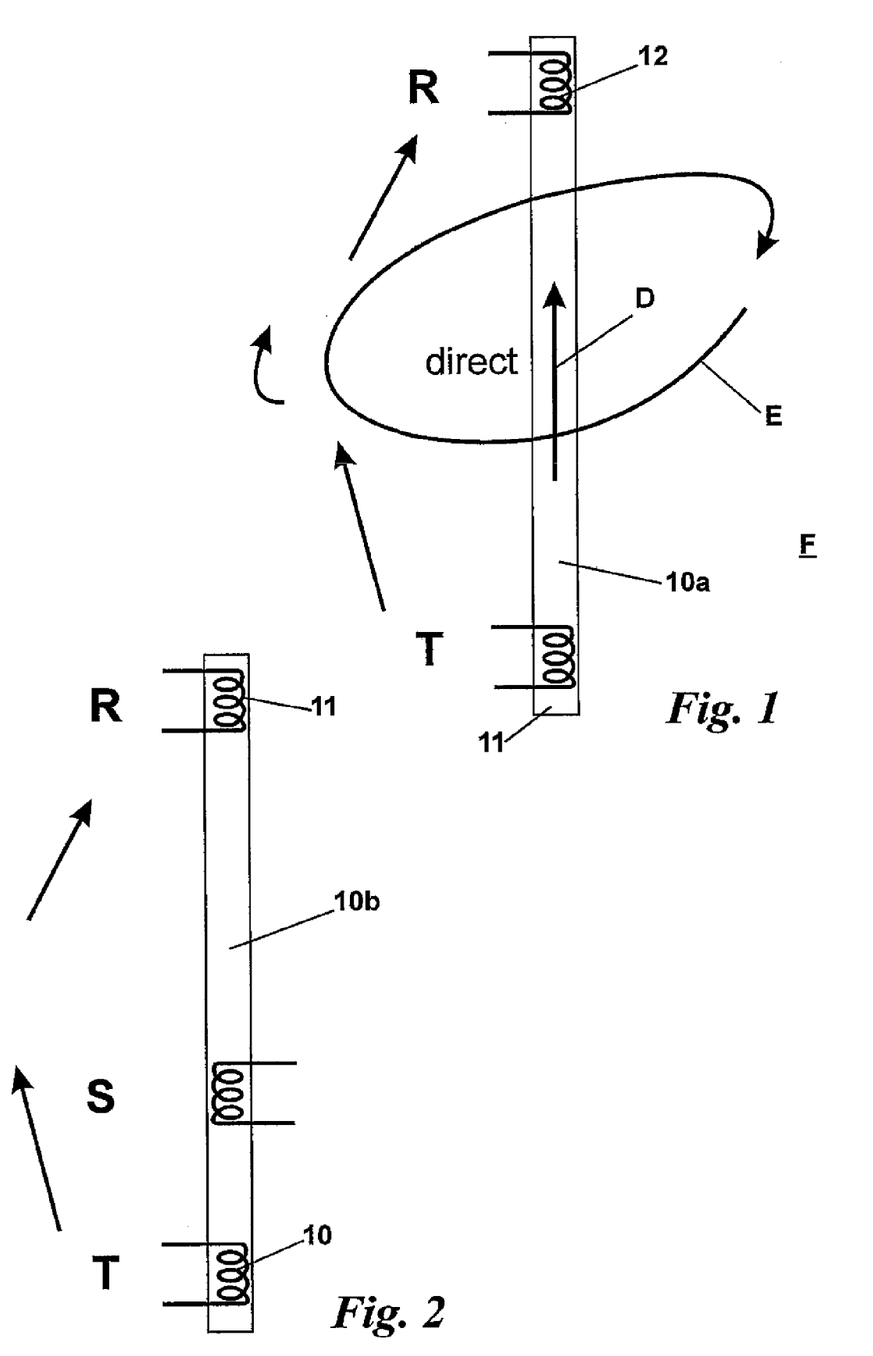
FIG. 1 shows in schematic form a simple form of induction logging tool.
FIG. 2 shows such a tool including a secondary coil S whose purpose is to eliminate the effects of directly coupled, primary currents.

FIG. 1 illustrates the operation of a simple form of induction tool 10*a*.

As is apparent from FIG. 1, a transmitter T shown schematically as a coil 11 induces eddy currents E in the formation F. These travel through the formation, that includes the hydrocarbon-bearing fluid under investigation, to be detected by a receiver R also in the form of a coil 12. The receiver coil R couples the eddy currents and is spaced from the transmitter coil T by a distance selected to make the signal at the receiver R preferentially responsive to the eddy currents circulating in a certain range of distances into the geological formation F around the well-bore. The distance in the formation from which half the signal at the receiver originates is commonly assigned as the depth of penetration of that receiver.

At the same time as the eddy currents E are transmitted however, direct induction of current in the receiver occurs via a transmission path D constituted by the logging tool itself. Current transmitted via this direct path is referred to herein as primary current.

Such current contains no geological information since it has not passed through the formation. The primary current therefore can be regarded as noise.

A prior art technique for eliminating this noise in a simple tool as shown in FIG. 1 relies on the fact that the phase of the primary current differs by 90 degrees from that of the current that has passed through the formation. This permits the use of a circuit known as a phase detector to identify the primary current and eliminate its effects from the data transmitted to a surface location for inclusion in a log.

There are however various drawbacks of employing a phase detector alone in a simple induction tool.

Another approach adopted in the prior art is to employ in the logging tool intermediate the transmitter T and receiver R a secondary coil S (shown in the tool 10*b* of FIG. 2) whose design (especially in terms of the phasing of its windings) and location are such as to cancel the direct, primary current.

A further problem of induction tools however arises when the formation suffers from invasion.

When the formation surrounding the tool is "invaded" the drilling fluid or other chemicals migrate a distance into the formation in the vicinity of the wellbore. Invasion can lead to very significant errors in the output of an induction logging tool, because the conductivity of the invaded zone is not the same as that of the formation containing the hydrocarbons or other substances of commercial value.

In order to alleviate the problems of using induction tools in invaded formation zones one arrangement adopted in the prior art involves the inclusion of multiple (e.g. four) receiver coils and corresponding secondary coils in the induction logging tool at different spacings from the transmitter coil T. The outputs of the plural receiver and secondary coils can then be combined according to a subtle algorithm that assigns weighting and sign values to the outputs of the coils so as to cancel the dramatic effects of the resistivity disparities of the invaded, non-invaded and well-bore regions. A tool including multiple coils of this nature is sometimes referred to as an "array tool" or a "multiple array tool". Such tools were first proposed in the 1980's.

Figure 3:
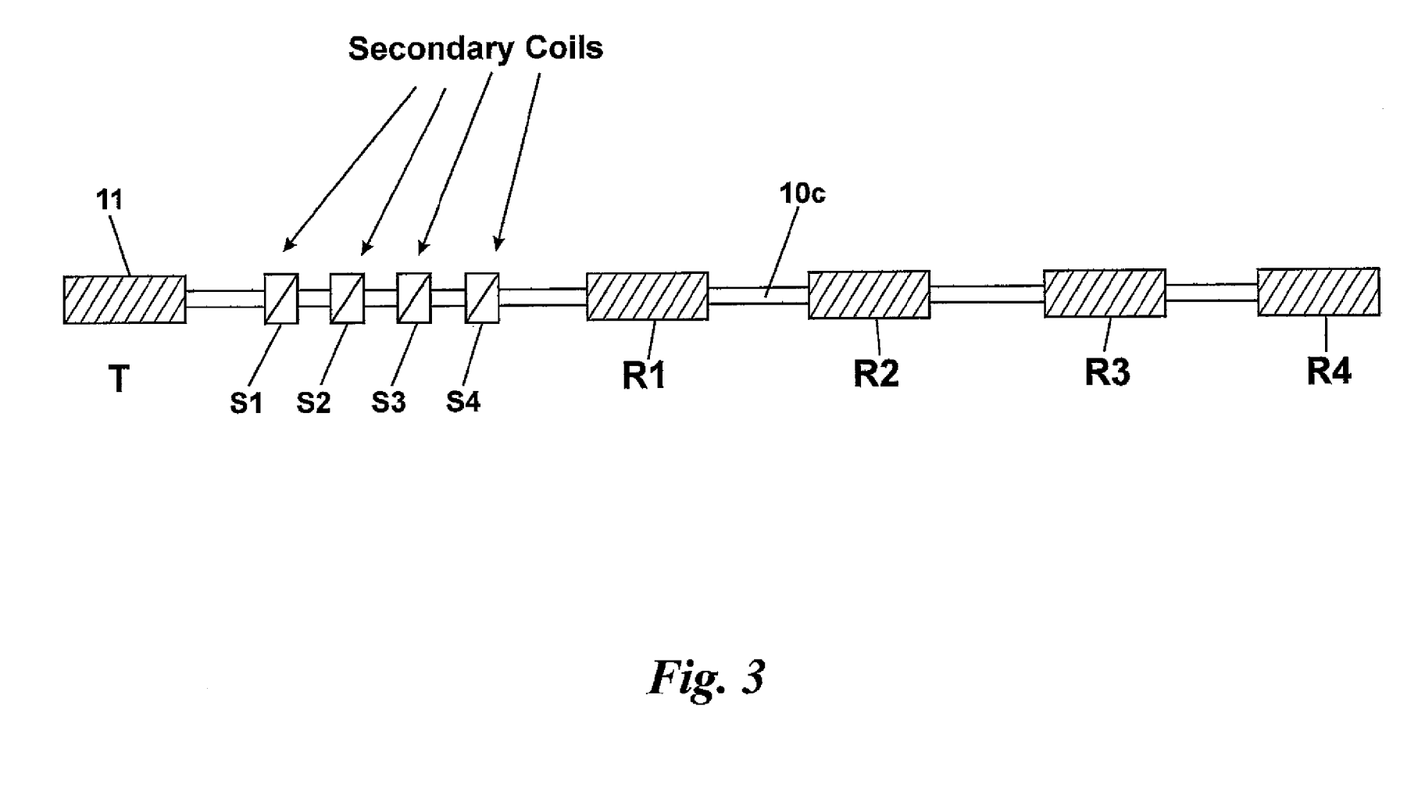
FIG. 3 shows an array induction logging tool.

An array tool 10*c* is visible in FIG. 3. In the tool 10*c* of FIG. 3 there are four secondary coils S1, S2, S3, S4 and four receiver coils R1, R2, R3, R4. The receiver coils R and the secondary coils S are designed and positioned so as to maximize the desired noise cancelling effect.

The output of coil R1 is referred to as the "Channel 1" output, the output of coil R2 the "Channel 2" output and so on. The signals generated by coil R1 and transmitted as "Channel 1" signals contain the least geological information by reason of the induced current having passed through relatively little of the formation before returning to the tool 10*c*. The Channel 4 signals by the same reasoning contain the largest amount of geological information.

On the other hand certain attributes of the Channel 1 signal (such as its spatial resolution) are the best of the four signals generated, by reason of the short transmission path between coil T and coil R1.

As is indicated above the induction logging tool is a narrow cylinder, containing a coil array, that typically might be 1.5 meters or more in length. In an array tool 10*c* as shown in FIG. 3 the receiver coils R are spaced over a significant distance such that the signals from them each relate to different depths of the formation. In addition the multiple secondary coils S are also spaced over part of the length of the tool.

As is apparent from the tool layout of FIG. 3 therefore the four receiver coils R cannot each simultaneously log precisely the same part of the formation, for the simple reason that the coils are, as stated, distributed along the tool and hence at a given time each analyze induced currents returning via different parts of the formation.

It is however possible when creating a log from the signals of the four channels to adjust the depth at which each coil appears to generate signals. The aim of this is to take account of the spacings of the coils from one another along the tool 10*c* as explained above.

Following such adjustment one would expect the four log signals when plotted graphically each to mimic each other closely, perhaps differing only in terms of amplitude, and thereby each show in essentially the same way the features of the formation logged. This however is rarely if ever the case. Indeed, one coil R of the tool 10*c* may completely "miss" a feature identified by the other coils, or may show it in a distorted form or in the wrong location.

The reason these phenomena arise is that the spatial resolutions of the receiver coils R1, R2, R3, R4 differ from one another. In other words, even if one adjusts an array induction log for the spacings of the coils this is of limited benefit since the lack of spatial resolution of at least some of the coils means that this exercise cannot be completed with adequate accuracy.

It follows that there is a need to improve the spatial resolution characteristics of multiple-channel logging tools in general and array induction tools in particular.

According to the invention in a first aspect there is provided a method of enhancing one or more attributes of a log, of a geological formation including convolved data generated in plural measurement channels corresponding to plural measurement devices, the method comprising the steps of:

selecting data (herein "the selected data") corresponding to a single said channel and deconvolving it; and seeking to impose one or more attributes of the resulting deconvolved data onto the log data of plural said channels in order to create an enhanced log.

The data (i.e. log data) contemplated in the method of the invention can be considered as the convolution of geological data with a logging tool spatial vertical response function. It follows that the step of deconvolving data from a single channel involves removing from the data the effects of the perturbation mentioned above that is caused by the tool and that as stated adversely affects the spatial resolution of the data logged.

The method of the invention is particularly suited for use when the logging tool is an array induction tool, but the method also is applicable to a range of other multi-channel logging devices.

Furthermore although the invention is disclosed herein with reference to the logging of a wellbore that is filled with OBM, the method of the invention may also be successfully used when other substances, such as but not limited to water-based muds and air in air holes, are present in the wellbore. Moreover the method may successfully be used in other kinds of boreholes than wellbores.

Preferably the attribute is the spatial resolution of the log data, and the effect of deconvolving the selected data therefore is to sharpen its spatial resolution. In the case of the data being obtained from plural measurement devices contained within a single logging tool, and especially an array induction tool, the data exhibiting the best (i.e. "sharpest") spatial resolution characteristic is that of Channel 1. It follows therefore that in a preferred embodiment of the invention the single channel the data of which is selected is Channel 1 of an array induction tool; but when the method of the invention is operated in relation to other multiple channel tool types this need not be the case.

Preferably the method includes the step of, before deconvolving the data of the said single channel, calibrating the data of the log corresponding to each channel.

This technique, which is known per se, is a conventional step whose purpose is to assign a common measurement scale to the log data so that when they are plotted or otherwise made use of the data from different receiver coils can be compared with one another.

Conveniently the method includes the step of, before imposing one or more attributes of the deconvolved data onto log data of plural said channels, correcting the data of each channel for electromagnetic propagation effects known as skin effects.

The method also preferably includes the step of, before imposing one or more attributes of the deconvolved data onto log data of plural channels, optionally symmetrising the data corresponding to each channel by use of an appropriate digital filter; and optionally the step of, before imposing one or more attributes of the deconvolved data onto log data of plural channels, correcting for borehole effects the data corresponding to each channel.

"Symmetrisation" of log data has the effect of making the data non-directional. Symmetrisation is sometimes of considerable benefit. Whether or not to symmetrise data is often determined by the nature of the log data and the uses to which the log analyst wishes to put it.

Correcting for skin effects, symmetrising and correcting for the effects of the borehole are all techniques known per se in the induction logging art, and the terms as used herein will convey a ready meaning to the worker of skill and therefore in the interests of economy they are not described further herein.

Conveniently the method includes in the process of imposing one or more attributes of the deconvolved data onto log data of plural channels, complementary filtering the data corresponding to each channel so as to match a predetermined logging tool resolution.

By "complementary filtering" is meant a technique of convolving data of one log with a response function of another. This is explained in more detail below.

It is important to match the vertical spatial resolution of multiple measurements so that when the measurements are subsequently studied in a geological interpretation they encompass the same distance along the well-bore.

In a particularly preferred embodiment the method of the invention includes the step of calculating a zeroed coefficient of semblance between the selected data (from the channel being used as the source of good spatial resolution) and the data corresponding to each said channel and, in the case of each channel, determining whether the zeroed coefficient of semblance attains a predetermined value and if so imposing a proportion of the character of the deconvolved data onto the log data of the said channel governed by a function of the zeroed semblance.

This step advantageously assures that the imposition of attributes of data of the selected single channel onto the data of all the channels of the log only occurs if the semblance between the deconvolved data and the convolved data is good enough. This in turn means that the step of imposing attributes may not occur in respect of all the data of a log and as a consequence the method does not seek to perform impermissible adjustments or those that will not have a beneficial effect on the resolution of the log data.

Conveniently the calculated zeroed semblance is the value of a zeroed coefficient of semblance between the complementary filtered data from the selected channel being used as the source of good spatial resolution and convolved log data of each respective channel. The concepts of semblance generally, and of a "zeroed coefficient" of semblance, are described in more detail below.

Preferably the method of the invention optionally includes the steps of creating a plot of the data of the resulting, enhanced logs against their respective depths of investigation; establishing whether the plot appears to approach an asymptote; and, if so, determining the value of the asymptote. Using this technique it is possible to establish from the value of the asymptote the undisturbed value of the resistivity of the formation at the depth of the wellbore under investigation. The undisturbed value of the resistivity usually is of great interest to log analysts and others involved in assessing the substances in underground formations.

To this end therefore the method preferably includes the step of transforming the asymptote value into the resistivity of the geological formation.

BRIEF DESCRIPTION OF THE SEVERAL VIEWS OF THE DRAWING(S)

There now follows a description of preferred embodiments of the invention, by way of non-limiting example, with reference being made to the accompanying drawings in which.

DETAILED DESCRIPTION

Referring to the drawings, as explained above FIGS. 1-3 illustrate certain basic principles of induction logging tools 10a, 10b, 10c. As explained the method of the invention is applicable when using an array induction tool such as tool 10c of FIG. 3, and also to any of a range of other types of tool having multiple detectors or receivers and hence being capable of producing multiple-channel outputs.

Figure 4:
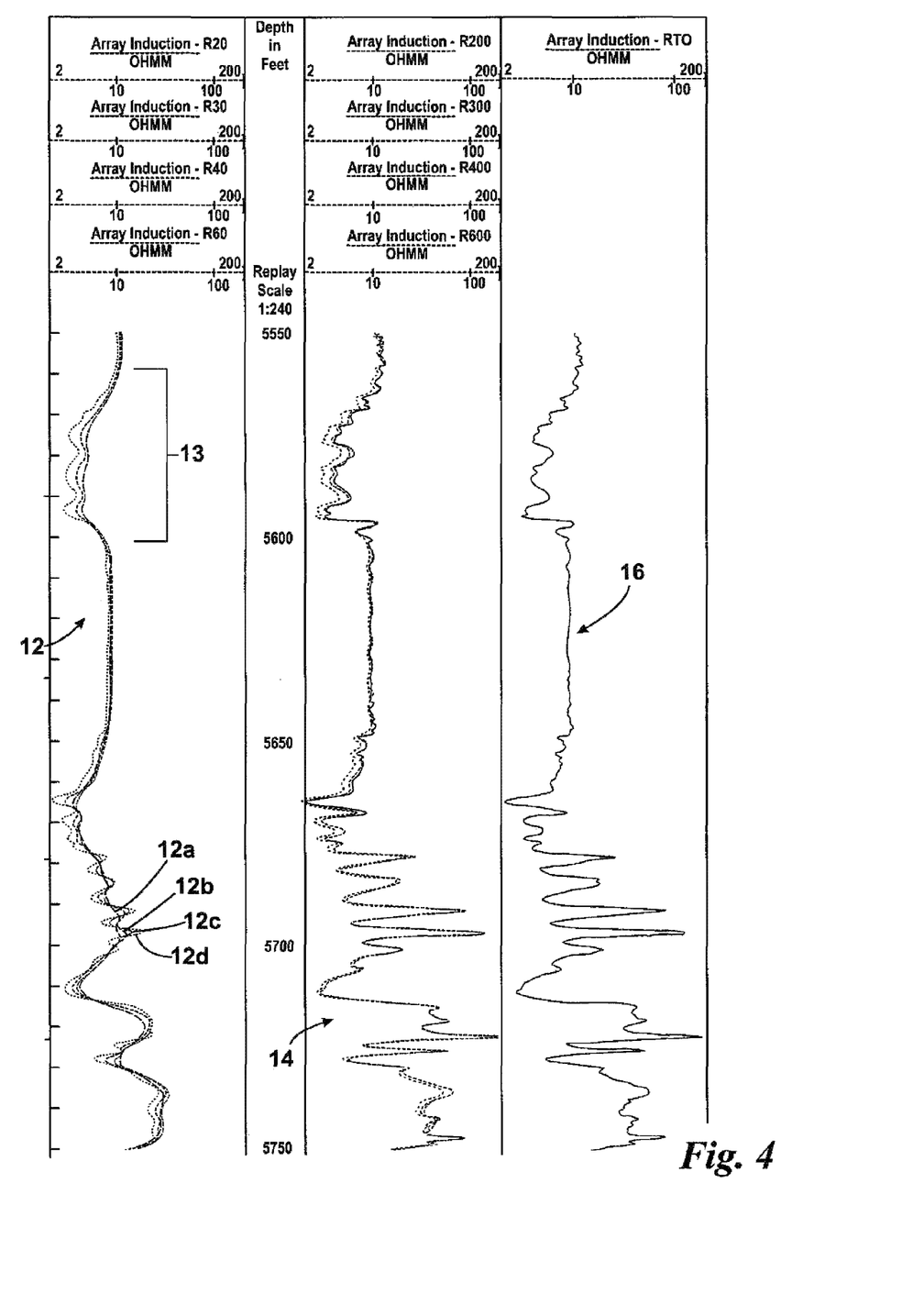
FIG. 4 shows the effect of the method of the invention on exemplary log data.

A typical output of array induction tool 10c as shown in FIG. 3 is visible in the left-hand set of logs 12 (commonly referred to in the logging art as "Track 1") of FIG. 4.

FIG. 4 shows in the log set 12 the plotting of data from four channels corresponding to the four receiver coils R1, R2, R3 and R4 of the logging tool 10c.

The key in FIG. 4 identifies each log according to the receiver that generated it. Thus "Array Induction—R60" identifies the log data 12a in FIG. 4 transmitted as "Channel 4" and generated by coil R4; "Array Induction—R40" the log data 12b of "Channel 3" generated by receiver R3, "Array Induction—R30" the log data 12c of "Channel 2" generated by receiver R2 and "Array Induction—R20" the log data 12d of Channel 1 generated by receiver R1.

Although the output of an induction tool is a measure of the conductivity of the formation logged, this can easily be inverted to provide a resistivity measurement. This has been done in the logs of FIG. 4, such that the units of the logs are Ohm Meters as indicated in the Figure.

The logs 12 are typical of the plots that result from techniques of calibrating the log data, symmetrising it, depth aligning the logs, correcting for skin effects and correcting for borehole effects as mentioned herein. Despite these methods aimed at improving the consistency and readability of the log data, it is apparent from visual inspection of the logs 12 that there is considerable variability from one log to another. This is so even though each of the logs 12 is supposed to be identifying the same features of the formation at the same depth of the borehole.

As an example one may consider the region 13 of the logs 12, in which despite the various corrective measures mentioned there is significant variability of both the resistivity values corresponding to certain depths of the formation and also quite marked variability of the shapes of the plots. This results from differing resolution characteristics of the respective receivers in the array tool.

Since the resistivity values and the plot shapes convey much information to the log analyst, the "raw" logs 12 of FIG. 4 may be confusing or contradictory in the region 13.

Other areas of ambiguity of the logs are apparent at numerous other locations along the log plots 12.

The logs 14 of FIG. 4 show the benefit of performing the method of the invention on the logs 12. In the logs 14 an attribute of the deconvolved (as explained herein) Channel 1 log of the set 12 has been imposed onto each of the remaining logs.

As is starkly apparent from the logs 14 in deconvolved form the Channel 1 data exhibits a spatial resolution that is considerably "sharper" than the convolved form. When this spatial resolution is imposed onto the other logs these too adopt much better, and more consistent, spatial resolution characteristics than is the case in the logs 12. As a consequence the types of ambiguity evident from inspecting the logs 12 are reduced or eliminated from the logs 14.

As indicated, in the process of imposing the attributes of the Channel 1 data on the remaining logs, a process of complementary filtering typically but not necessarily is completed. One form this may take is to convolve the data of e.g. Channel 3 with the response function of the receiver R2 that gives rise to the Channel 2 data and vice versa; and e.g. the Channel 4 data with the Channel 1 response function and vice versa. This results in groups of data that have more closely similar response characteristics than would otherwise be the case. The effects of this optional step in other words enable a more precise resolution match to take place than would otherwise be the case.

An example of how in practice complementary filtering may be carried out appears in U.S. Pat. No. 5,019,708, especially in Column 7 Line 33 to Column 8 Line 32 thereof. In this publication the term "cross-correlation" is used to refer to the technique of complementary filtering described herein. The entire disclosure of U.S. Pat. No. 5,019,708 is incorporated herein.

FIGS. 5a, 5b, 5c, 5d, 5e and 5f illustrate the concept of a zeroed coefficient of semblance as used herein. As mentioned, this concept is employed in order to establish the extent to which it is appropriate or possible to modulate the extent of the imposition of Channel 1 (or other selected) data onto the other curves of a set of logs. The idea of employing a zeroed coefficient of semblance is to ensure that the imposition of high resolution attributes occurs only when it is desirable, from the standpoint of the compatibility of the various logs, to do so.

FIGS. 5a, 5b, 5c and 5d show four logs that may be any of a range of types of log(and that are shown as induction logs for illustrative purposes only) in schematic form. As is evident FIG. 5b ("Curve 2") shows the same curve as FIG. 5a ("Curve 1") except that the curve is shifted.

Figure 5A:
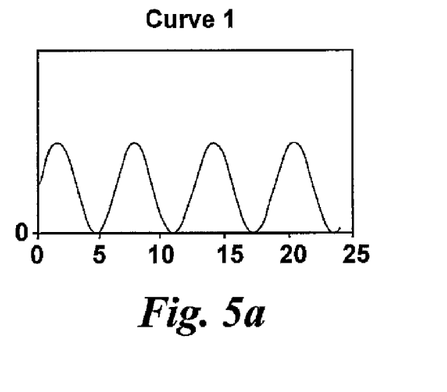
FIGS. 5a-5f illustrate the concept of zeroed semblance as used herein.
Figure 5B:
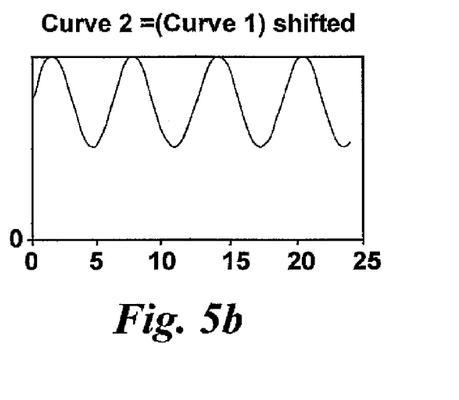
Figure 5C:
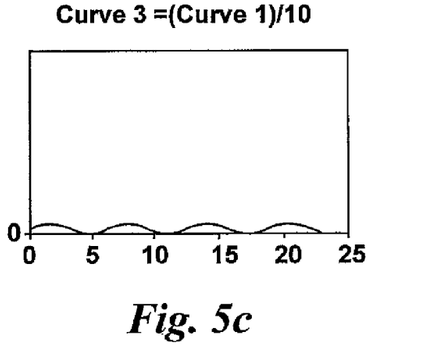
Figure 5D:
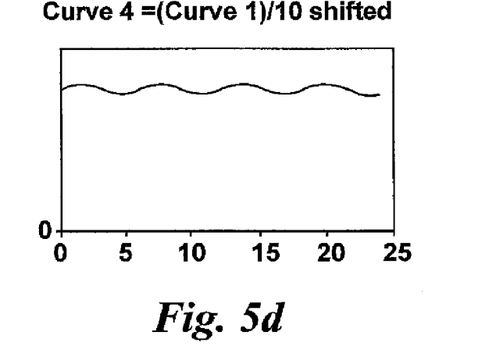

"Curve 3" of FIG. 5c is not the same curve as Curve 1 since its amplitude is different. "Curve 4" of FIG. 5d is Curve 3 shifted in a similar manner to Curve 2.

The correlation of all four curves is perfect since this is a function that is sensitive only to the shape of a curve, and not to amplitude or shift. This function therefore is of no help in ensuring that the curves are all measuring the same part and therefore parameters of the formation. In other words the even though the curves plainly have different sensitivities and measure different parts of the formation an attribute imposition modulation technique based on correlation would not eliminate the erroneous results indicated above as being undesirable.

Semblance on the other hand is a function that is sensitive to the absolute amplitude.

The semblance between all the curves is poor. None of the curves has the same absolute amplitude value, at a given point on the x-axis, as any of the others. Therefore it would not be possible to use semblance as a means of establishing whether any two of the curves relate to the same part of the formation when seeking to modulate the imposition of a high resolution attribute of one of them on another that is of lower resolution.

If however the curves are filtered using a filter that "zeroes" them, i.e. that filters two of the said logs using a filter that passes a signal in a spatial frequency band that has zero transmission at zero frequency, the semblance is improved.

Figure 5E:
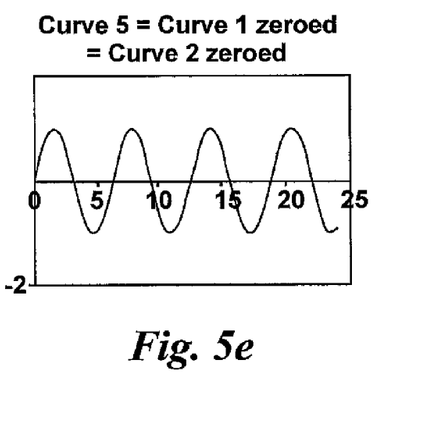
Figure 5F:
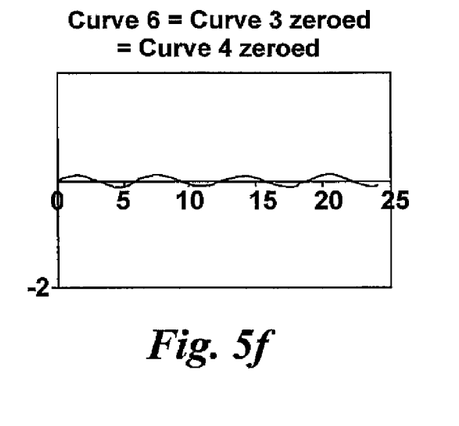

FIGS. 5e and 5f show the effects of filtering ("Curve 5", FIG. 5e) Curves 1 and 2 on the one hand and ("Curve 6", FIG. 5f) Curves 3 and 4 on the other using such a zeroing filter. As illustrated in each case this makes the curves of the same amplitude the same as one another by eliminating the effect of the shift referred to above.

Following such filtering the semblance of Curves 1 and 2 is perfect. The semblance of curves 3 and 4 is also perfect; but the semblance of Curves 5 and 6 is poor, implying that following filtering Curve 1 may be used to influence the resolution of Curve 2 and vice versa but neither of Curves 3 or 4 may be so used. The converse is also true.

It follows that through using a zeroing filter in this way an "automatic" filtering technique arises since the logs that the curves represent are brought into vertical alignment and then the zeroed semblance value indicates either a good or a poor extent to which one curve of a pair may be used to influence the other. Such a filtering process therefore conveniently may be employed in order to limit, or modulate, the extent to which the method of the invention imposes a good log attribute on a log that exhibits the said log attribute only poorly. The method of the invention therefore can if desired be employed only when the "zeroed semblance" value attains a predetermined value, or lies within a predetermined range of values. In this way operation of the method of the invention may be made "self-regulating".

The filter may be embodied in software or may be hard wired, depending on the precise apparatus used to process the log data. The filter may if desired be incorporated into an induction logging tool or may exist e.g. at a surface location.

The technique of filtering as described before establishing the degree of similarity of two curves is referred to herein as the use of a "zeroed semblance" technique. An "enhancement coefficient" that is a function of the zeroed semblance is one by which a given log is multiplied in order to give effect to the resolution imposition that is desired.

The plot 16 of FIG. 4 shows the result of a further, optional aspect of the method of the invention. This involves assessing the four curves 14 and establishing whether at each point in along the wellbore depth logged the series of resistivity values approaches an asymptote. If so, the value of the asymptote is taken to be the true, or undisturbed resistivity value at the particular depth under consideration.

The plot 16 is the result of calculating the undisturbed resistivity mentioned above at each point along the depth logged. The single curve that is plotted may be considered as a composite of the four plots 14. The presentation of this asymptotic or undisturbed resistivity data as a single plot such as plot 16 is often of considerable benefit, especially when it is needed to present or transmit resistivity or conductivity data in a simplified form. It is not however essential to obtaining the improvements in spatial resolution gained by practicing the basic version of the method of the invention.

Determination of the asymptotic value can in respect of any part of a log be calculated according to a general expression as will occur to the worker of skill in the art using e.g. a suitably programmed digital computer. This may form part of apparatus used for analyzing well logs.

On occasion the receiver outputs may not converge towards an asymptote. This can be caused by an invaded section of the wellbore. When the nature of the fluid invasion into the formation gives rise to range of values that when plotted against their depths of penetration into the formation do not appear to approach an asymptote, an alternative estimate of the true formation conductivity or resistivity can be made from the two receivers that are furthermost from the transmitter. These two receivers are only affected to a small degree by the invasion, and the perturbation of their values from the true conductivity or resistivity is small enough to be considered to be linear with the perturbation, governed by a perturbation coefficient. This can be expressed mathematically as:

$$C3=k3*P+(1-k3)*Ct$$

$$C4=k4*P+(1-k4)*Ct$$

C3 is the conductivity signal at one of the two receivers referred to above and C4 the conductivity signal at the other.

K3 is the perturbation rate of the C3 signal and k4 the perturbation rate of the C4 signal. The perturbation itself, P, and the true (undisturbed) formation conductivity Ct are common to both signals.

The perturbation, P, can be eliminated from these two equations and an expression for Ct derived as:

$$Ct=G*C4+(1-G)*C3$$

where G is a constant and is equal to k3/(k3−k4).

The undisturbed resistivity can than be computed simply as 1/Ct.

This analysis will be recognised by those skilled in the art as a generalised analysis of an expression giving rise to a "spine and rib" plot.

The invention relates to a method of enhancement, of a log, that comprises various optional and essential enhancement components as disclosed herein. One way therefore of considering the method of the invention in its broadest form is to regard the enhancement process as being one of incorporating one or more attributes of a relatively high resolution log into a relatively low resolution log. Consider a first log that preferably is a relatively low-resolution log and a second log that preferably is a relatively high-resolution log; in this case the incorporating step preferably includes:

(i) convolving the first low-resolution, log with the response of the detector or receiver responsible for the second log to generate a complementary filtered low-resolution log;

(ii) convolving the second, high-resolution log with the response of the detector or receiver responsible for the first log to generate a complementary filtered high-resolution log that exactly matches the complementary filtered low-resolution log of Step (i);

(iii) dividing the complementary filtered high-resolution log by the second log to generate a ratio log; and (iv) dividing the complementary filtered low-resolution log of Step (i) by the ratio log to generate a log containing the geological information of the first log and having the vertical resolution of the second log The method of the invention preferably is carried out using an appropriately programmed digital computer, although it could be performed in other ways if desired. The use of a digital computer however is generally the most suitable since firstly it offers advantages in terms of speed of processing and secondly it allows the convenient storing and transmission of processed log data in electronic form.

The invention claimed is:

1. A method of enhancing one or more attributes of a log, of a geological formation, the method comprising the steps of transmitting energy into the formation and detecting energy that has been altered by the formation in order to generate data in plural measurement channels corresponding to plural measurement devices respectively assigned to differing depths of penetration of the formation by the transmitted energy, the method comprising the steps of:

selecting data corresponding to a single said channel and deconvolving it; and imposing one or more attributes of the resulting deconvolved data onto log data of plural said channels in order to create an enhanced log, whereby the enhanced log contains geological information of the plural said channels and a vertical resolution of the single said channel.

2. A method according to claim 1 wherein the attribute is the spatial resolution of the log data; and wherein the step of deconvolving the selected data improves its spatial resolution.

3. A method according to claim 1 or claim 2 including the step of obtaining the log data from plural measurement devices contained within a single logging tool.

4. A method according to claim 3 wherein the logging tool is an array induction tool and wherein the single channel the data of which is deconvolved is Channel 1 of the tool.

5. A method according to claim 1 including the step of, before deconvolving the data of the said single channel, calibrating the data of the log corresponding to each channel.

6. A method according to claim 1 including the step of, before imposing one or more attributes of the deconvolved data onto log data of plural said channels, correcting the data of each channel for skin effects.

7. A method according to claim 1 including the step of, before imposing one or more attributes of the deconvolved data onto log data of plural channels, symmetrising the data corresponding to each channel.

8. A method according to claim 1 including the step of, before imposing one or more attributes of the deconvolved data onto log data of plural channels, correcting for borehole effects the data corresponding to each channel.

9. A method according to claim 1 including the step of, in the process of imposing one or more attributes of the deconvolved data onto log data of plural channels, complementary filtering the data corresponding to each channel so as to match a predetermined logging tool resolution.

10. A method according to claim 1 including the step of calculating a zeroed coefficient of semblance between the selected data and the data corresponding to each said channel and, in the case of each channel, determining whether the zeroed coefficient of semblance attains a predetermined value and if so imposing a proportion of the character of the deconvolved data onto the log data of the said channel governed by a function of the zeroed coefficient of semblance.

11. A method according to claim 10 wherein the calculated proportion is calculated as a function of the value of a zeroed coefficient of semblance between the data from the selected, single channel and log data of each respective channel.

12. A method according to claim 1 including the steps of creating a plot of the data of the resulting, enhanced log; establishing whether the plot appears to approach an asymptote; and, if so, determining the value of the asymptote.

13. A method according to claim 12 including the step of transforming the asymptote value into the resistivity of the geological formation.

14. A method according to claim 1 including the use of an array induction tool to generate the data.

15. A log generated in accordance with the method of claim 1.

16. A method of enhancing one or more attributes of a log, of a geological formation, the method comprising the steps of transmitting energy into the formation and detecting energy that has been altered by the formation in order to generate data in plural measurement channels corresponding to plural measurement devices respectively assigned to differing depths of penetration of the formation by the transmitted energy, the method comprising the steps of:
  selecting data corresponding to a single said channel and deconvolving it;
  imposing one or more attributes of the resulting deconvolved data onto log data of plural said channels in order to create an enhanced log;
  creating a plot of the data of the resulting enhanced log;
  establishing whether the plot appears to approach an asymptote; and
  if so, determining the value of the asymptote.

17. A method of enhancing one or more attributes of a log, of a geological formation, the method comprising the steps of transmitting energy into the formation and detecting energy that has been altered by the formation in order to generate data in plural measurement channels corresponding to plural measurement devices respectively assigned to differing depths of penetration of the formation by the transmitted energy, the method comprising the steps of:
  selecting data corresponding to a single said channel and deconvolving it;
  imposing one or more attributes of the resulting deconvolved data onto log data of plural said channels in order to create an enhanced log;
  creating a plot of the data of the resulting enhanced log;
  establishing whether the plot appears to approach an asymptote;
  if so, determining the value of the asymptote; and
  transforming the asymptote value into the resistivity of the geological formation.

* * * * *